United States Patent [19]

Klerfors

[11] Patent Number: 5,367,197
[45] Date of Patent: Nov. 22, 1994

[54] SERIES CAPACITOR EQUIPMENT

[75] Inventor: Bertil Klerfors, Västerås, Sweden

[73] Assignee: Asea Brown Boveri AB, Västerås, Sweden

[21] Appl. No.: 110,831

[22] Filed: Aug. 24, 1993

Related U.S. Application Data

[63] Continuation of Ser. No. 655,025, Feb. 14, 1991, abandoned.

[30] Foreign Application Priority Data

Feb. 16, 1990 [SE] Sweden ............................ 9000554-7

[51] Int. Cl.⁵ ................................................ H02J 1/02
[52] U.S. Cl. .................................... 307/105; 323/211
[58] Field of Search ................ 307/102, 103, 105; 323/210, 211; 322/58

[56] References Cited

U.S. PATENT DOCUMENTS

| | | | |
|---|---|---|---|
| 3,992,661 | 11/1976 | Kelley, Jr. ........................... | 323/210 |
| 3,999,117 | 12/1976 | Gyugyi et al. ...................... | 323/211 |
| 4,275,346 | 6/1981 | Kelley, Jr. ........................... | 323/210 |
| 4,292,545 | 9/1981 | Hingorani ........................... | 307/102 |
| 4,434,376 | 2/1984 | Hinogorani ........................ | 307/102 |
| 4,438,386 | 3/1984 | Gyugyi ................................ | 323/210 |
| 4,551,780 | 11/1985 | Canay ................................. | 361/113 |
| 4,607,217 | 8/1986 | Bhargava ............................ | 323/210 |
| 4,999,565 | 3/1991 | Nilsson ............................... | 323/210 |
| 5,032,738 | 7/1991 | Vithayathil ........................ | 307/112 |
| 5,202,583 | 4/1993 | Larsen et al. ...................... | 307/102 |
| 5,227,713 | 7/1993 | Bowler et al. .................. | 307/102 X |

OTHER PUBLICATIONS

Doradla, S. R., and Patel, B. K. "A Thyristor Reactive Power Compensator for Fast Varying Industrial Loads", International Journal of Electronics, Dec. 1981, vol. 51, No. 6, pp. 763-777.

*Primary Examiner*—A. D. Pellinen
*Assistant Examiner*—Fritz M. Fleming
*Attorney, Agent, or Firm*—Pollock, Vande Sande & Priddy

[57] ABSTRACT

Series capacitor equipment for connection into an electric power line (A) has a capacitor bank (C) and a controllable inductor connection (L, T1, T2) connected in parallel therewith and comprising a series connection of an inductor (L) and a controllable semiconductor connection (T1, T2). Further, the equipment comprises control members (CU) adapted, on the occurrence of a subsynchronous resonance oscillation, to control the semiconductor connection with separate control angle values during positive and negative half-cycles of the capacitor voltage for generation of a subharmonic voltage which counteracts the resonance oscillation.

10 Claims, 6 Drawing Sheets

SERIES CAPACITOR EQUIPMENT

This application is a continuation of application Ser. No. 07/655,025, filed Feb. 14, 1991, now abandoned.

TECHNICAL FIELD

The present invention relates to series capacitor equipment with a capacitor bank adapted for connection in series into an electric power line and with a controllable circuit, connected to the capacitor bank, for damping subsynchronous resonance oscillations.

BACKGROUND ART

In an electric power network, so-called subsynchronous resonance (SSR) oscillations may arise by the cooperation between mechanical oscillations in, for example, turbogenerators connected to the network and the electrical system. The oscillations may, for example, have a frequency of 20 Hz. They may have positive feedback (negative damping) and reach such amplitudes as to damage the shafts of the generator units.

The SSR oscillation has proved to be particularly serious in such networks which include power lines with series capacitors for compensation of the line inductance and thereby increasing the transmission capacity of the lines.

In has been proposed to connect, in series with each phase in the block transformer of a turbo-group and/or the star point of the generator, an ohmic damping resistor in parallel with an inductor and with a series resonance circuit tuned to the power system frequency. This solution is known from the Swedish published patent application with publication number 446 289. These damping circuits may be permanently connected or alternatively be put into operation under the control of a disturbance detector. This device comprises a large number of components, which must be dimensioned for the maximum current of the line. Therefore, the device will be expensive and space-demanding. The desired damping of SSR is further obtained by the consumption of power in the resistors of the device. These must therefore be so amply dimensioned or so efficiently cooled that they are able to take care of the large energies which are consumed during a damping process without being overstressed.

From, for example, U.S. Pat. Nos. 4,292,545 and 4,434,376, damping circuits for SSR are known, which are used in series capacitors in power lines. With the aid of thyristor valves, damping resistors are connected into the network circuit, for example in parallel with the capacitors, when an SSR occurs. The connection is initiated by a detector which connects a damping resistor each time that the length of a half-cycle of the line voltage exceeds a predetermined value, preferably approximately equal to the length of a half-cycle at a power system frequency equal to the system frequency of the network. Also in this device a heavily dimensioned resistor is required, which is a clear disadvantage from economical and practical points of view.

SUMMARY OF THE INVENTION

The invention aims to provide series capacitor equipment of the kind described in the introductory part of the specification which, with a minimum of additional components and practically without losses, provides an efficient damping of SSR.

What characterizes series capacitor equipment according to the invention will be clear from the appended claims.

The invention is based on the surprising realization that efficient damping may be obtained without energy being consumed in damping circuits in the usual way. Instead, the energy in the subharmonic oscillation is transformed into fundamental frequency power and is returned to the power network. This is done with the aid of an inductor and a controllable semiconductor valve which, in the vicinity of the zero crossings of the capacitor voltage, reverses the charge of the series capacitor and hence its voltage. How great the voltage change of the series capacitor because of the voltage reversal will be depends on how close to the voltage zero crossing the voltage reversal is started. By using suitable control members for varying the time of initiation of the voltage reversal from fundamental frequency half-cycle to fundamental frequency half-cycle concurrently with an SSR, a subharmonic voltage can be generated across the series capacitor, which subharmonic voltage counteracts the SSR that is to be damped.

BRIEF DESCRIPTION OF THE DRAWINGS

The invention will be described in the following with reference to the accompanying FIGS. 1-7.

DESCRIPTION OF THE PREFERRED EMBODIMENTS

Figure 1:
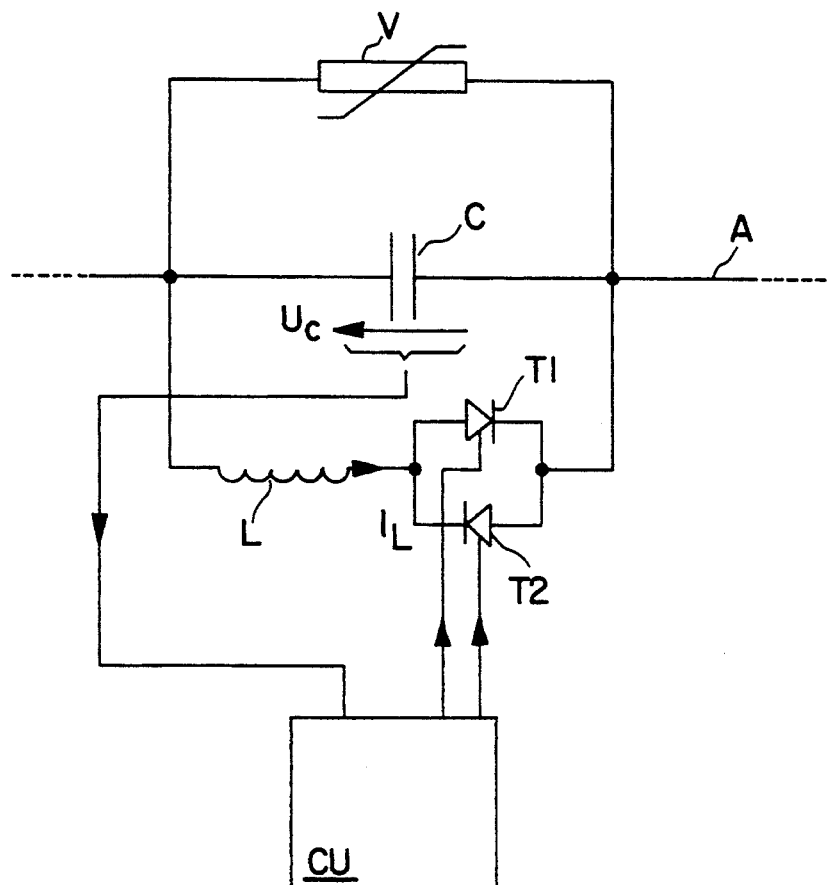
FIG. 1 shows equipment according to the invention, in which, in parallel with the series capacitor bank, an inductor is connected in series with two thyristor banks connected in antiparallel with each other.

FIG. 1 shows an example of series capacitor equipment according to the invention. A series capacitor C is connected into a power line A. For the sake of simplicity, the equipment and the power line are shown to be of single-phase design, but in practice power networks of the kind in question are always of three-phase design. The power line may be of any arbitrary kind, but in practice series capacitor banks occur primarily in power lines with relatively high voltages and extending over relatively large distances. An overvoltage protective device for the series capacitor may consist, in its simplest form, of the zinc oxide varistor V shown in FIG. 1 but is in practice often considerably more complicated, for example comprising controllable or not controllable spark gaps, damping circuits, etc. In parallel with the series capacitor C, an inductor L is connected in series with two thyristor valves T1 and T2 which are connected in antiparallel with each other. The inductor L suitably consists of an air inductor and its inductance is chosen such as will be described in greater detail below, suitably such that the reactance of the inductor at the system frequency of the power network is lower than, preferably considerably lower than, the reactance of the series capacitor C at the same frequency. The system frequency of the power network is the nominal operating frequency, that is, normally 50 Hz to 60 Hz. Each one of the thyristor valves may consist of one single thyristor or of a plurality of series-connected thyristors, the number of thyristors being sufficiently large for handling the maximum capacitor voltage arising.

For control of the equipment, a control device CU is provided. The control device is supplied with a signal which corresponds to the capacitor voltage $U_c$. This signal may be obtained with the aid of a voltage measuring device (not shown), for example a measuring voltage divider arranged across the capacitor bank. The control device delivers firing pulses to the thyristors in the two thyristor valves. The operation of the control device will be described in greater detail below with reference to FIGS. 4–7

Figure 2:
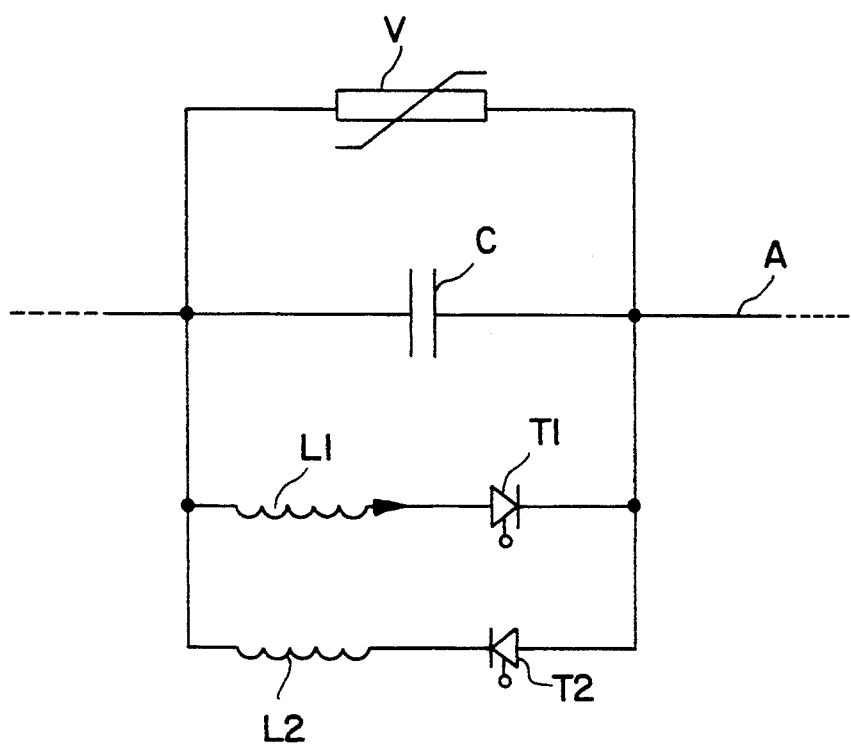
FIG. 2 shows an alternative embodiment of the equipment according to FIG. 1, in which the single inductor is replaced by two inductors, each one series connected to a thyristor valve.

In the schematic circuit diagram of FIG. 1, the control device is shown as if it were galvanically connected to the power components of the equipment. These components, that is, the capacitor bank, the inductor and the thyristor valves, are, however, located at the potential of the power line A, that is, at a voltage relative to ground which is often very high. For practical reasons it is often suitable to arrange the control device CU at ground potential, the connections between the control device and the other parts of the equipment then taking place via galvanically separated transmission channels, suitably via light guides. FIG. 2 shows an alternative embodiment of the inductor-thyristor circuit shown in FIG. 1. In FIG. 2, two separate inductors L1 and L2 are arranged in parallel with the capacitor bank C, each one of the thyristor valves T1 and T2 being arranged in series with one of the two inductors. The function is the same as in the equipment shown in FIG. 1.

Figure 3A:
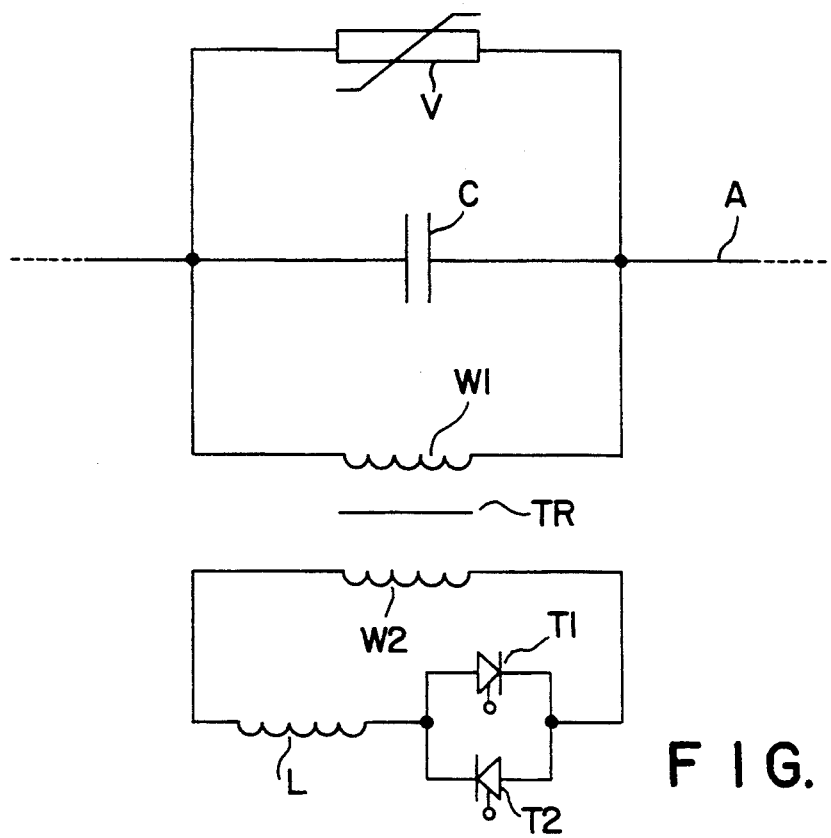
FIG. 3a shows how the inductor-thyristor connection may be connected to the series capacitor via a transformer.

FIG. 3a shows how the inductor-thyristor circuit L-T1-T2 may be connected to the series capacitor bank C via a transformer TR with the windings W1 and W2. With the aid of this connection, such an adaptation of the operating conditions of the inductor-thyristor circuit may take place that the current handling capacity of the thyristor valves is utilized in full, which may entail such a reduction of the operating voltage of the valves and hence of the number of series-connected thyristors in each valve that this saving is larger than the additional cost of the transformer.

Figure 3B:
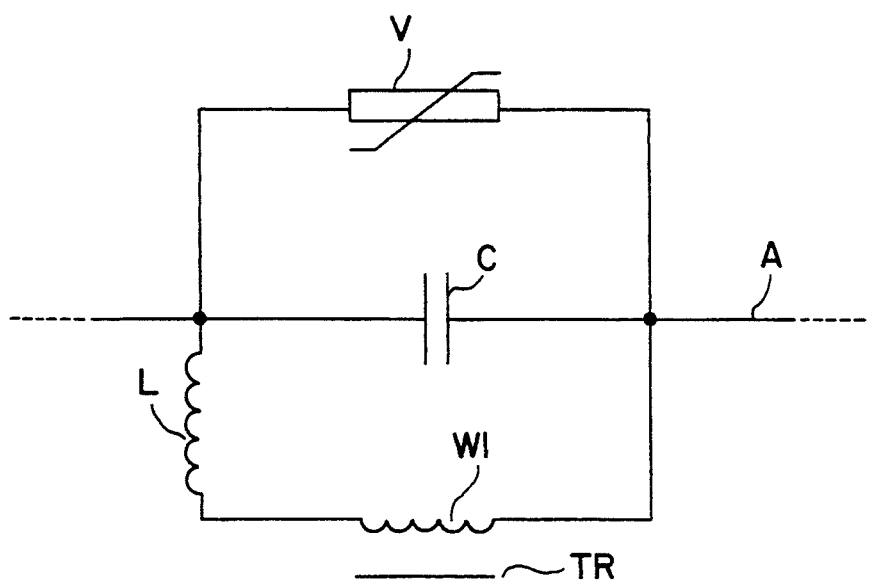
FIG. 3b shows how the thyristor valves only are connected to the main circuit with the aid of a transformer.

FIG. 3b shows a further alternative embodiment, in which only the two antiparallel-connected thyristor valves are connected to the main circuit via the transformer TR. In this case, the inductor L operates at the current and voltage level of the main circuit.

Figure 3B:
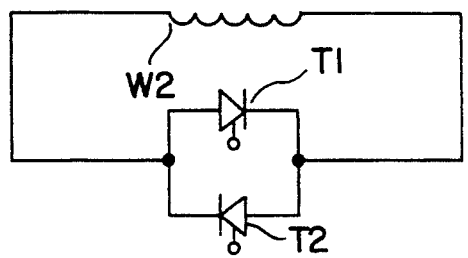

In both of the examples shown in FIG. 3, the necessary inductance may consist of the leakage inductance of the transformer, in which case the separate inductor may be omitted.

Figure 4:
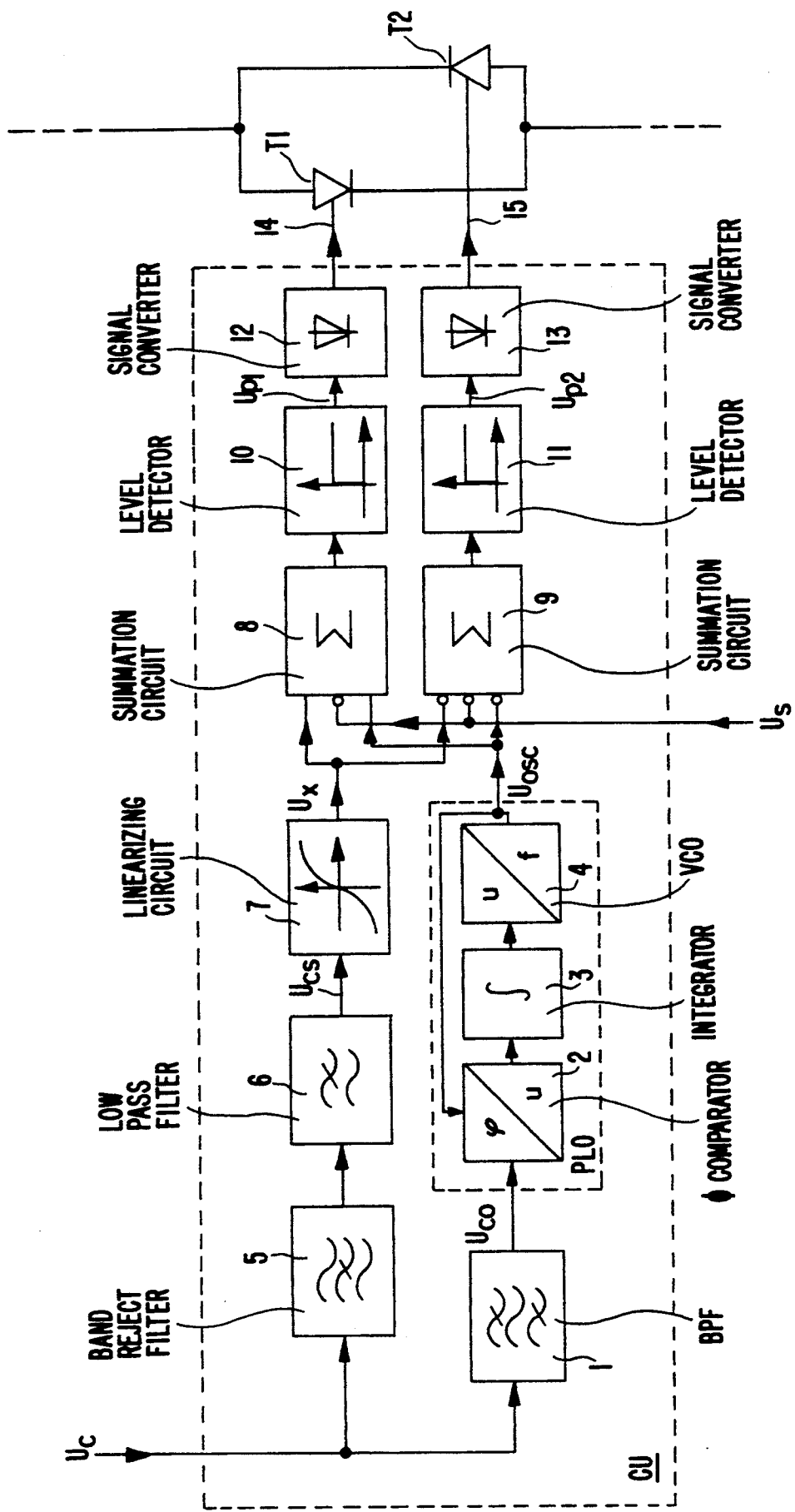
FIG. 4 shows an example of a control system in equipment according to the invention.

FIG. 4 shows an example of a possible configuration of the control device CU in FIG. 1. The capacitor voltage $U_C$ supplied to a bandpass filter 1, which lets through the system frequency of the networks but blocks higher and lower frequencies. Thus, the output signal $U_{co}$ from the filter corresponds to the fundamental frequency component of the capacitor voltage $U_c$. This output signal is supplied to a phase-locked oscillator PLO. In a phase comparison circuit 2, the output signal $U_{osc}$ of the oscillator is compared with the input signal $U_{co}$. A signal corresponding to the phase difference is supplied, via an integrator 3, to a voltage-controlled oscillator 4. The output signal from the oscillator will be controlled so that it will have the same frequency as the input signal $U_{co}$ to the oscillator. Further, the output signal will be kept at a constant phase position in relation to the input signal. This constant phase position is dependent on the design of the comparison circuit 2, and in the following the signal $U_{osc}$ is assumed to have a constant phase lag of 90 degrees related to the input voltage $U_c$. The signal $U_{osc}$ consists of a sinusoidal signal.

Further, the capacitor voltage $U_c$ is supplied to a band reject filter 5, which excludes the power system frequency component. The output signal from this filter is supplied to a low-pass filter 6, in which signal components with frequencies exceeding the expected subsynchronous oscillations are filtered out. The output signal from the filter 6 thus consists of a signal $U_{cs}$ which corresponds to a subsynchronous resonance oscillation in the capacitor voltage. The latter signal is supplied to a linearizing circuit 7. This circuit has such a characteristic, for example approximately of the type shown in FIG. 4, that the output signal $U_x$ of the circuit, independently of the amplitude of the fundamental frequency component of the SSR oscillation, controls the thyristors such that a subharmonic voltage is obtained across the capacitor, which with the desired degree of compensation counteracts the SSR oscillation arising.

The signals $U_x$ and $U_{osc}$ are supplied to a summation circuit 8, the output signal of which is supplied to a level detector 10. The output signal of the detector is supplied to the thyristor T1 as firing signal via a signal converter 12 and a signal channel 14. The signal converter 12 may for example, consist of a power amplifier and a light-emitting diode, and the signal channel 14 then suitably consists of a light guide. Further, the signals $U_x$ and $U_{osc}$ are supplied to inverting inputs of a second summation circuit 9, the output signal of which is supplied to a level detector 11. The output signal of the detector is supplied as firing signal to the thyristor T2 via a signal converter 13 and a signal channel 15. The firing signals from the level detectors 10 and 11 are designated $U_{P1}$ and $U_{P2}$, respectively.

A control signal US for symmetrical control of the inductor current and hence of the effective capacitance of the equipment is supplied to inverting inputs of the two summation circuits 8 and 9.

Figure 5:
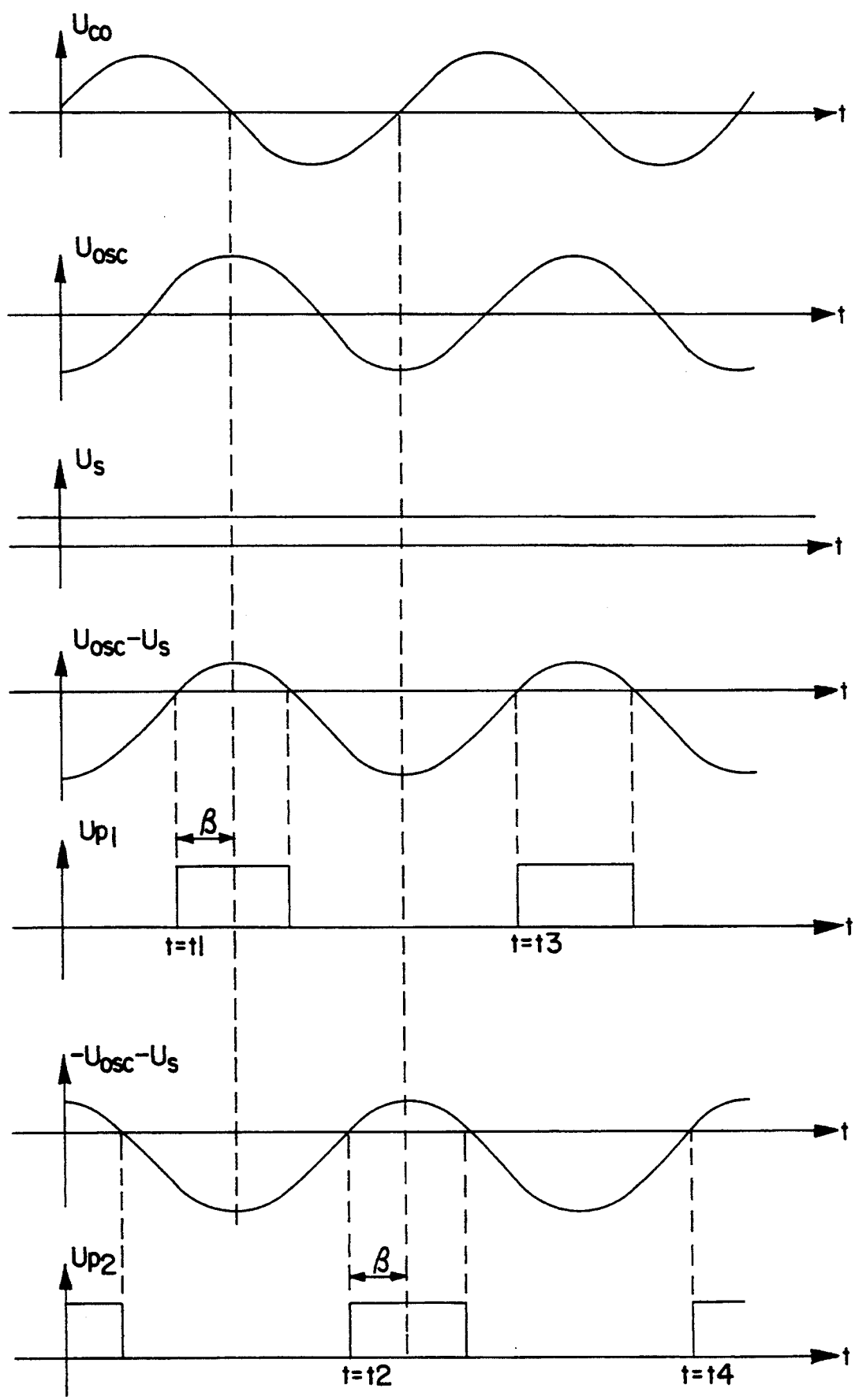
FIG. 5 illustrates the mode of operation of a thyristor-controlled inductor.

The mode of operation of the equipment described above will be described in greater detail below, first with reference to FIG. 5 and with the simplified assumption that the SSR component $U_x$ is zero. FIG. 5 shows a number of quantities occurring in the equipment as functions of the time t. At the top, the fundamental frequency component $U_{co}$ of the capacitor voltage is shown and below this the output voltage $U_{osc}$ from the phase-locked oscillator PLO is shown. Then the control signal $U_s$ is shown which, since it is assumed to vary slowly, may be regarded as constant during the time interval shown. Below this the output signal $U_{osc}-U_s$ from the summation circuit 8 is shown. When this output signal is positive, the level detector 10 delivers an output signal in the form of a firing pulse $U_{P1}$ to the thyristor T1. As shown in FIG. 5, the thyristor T1 will therefore be fired at the time t=t1, 5=t3 and so on. Each firing takes place an electrical angle D prior to the zero crossing of the fundamental frequency component $U_{co}$ of the capacitor voltage, that is, the thyristor T1 is controlled with the control angle $\beta$ relative to these zero crossings.

The output signal from the summation circuit 9 is the lowermost signal but one in FIG. 5, that is, signal $U_{osc}$. $-U_s$. The level detector 11 supplies firing pulses $U_{P2}$ to the thyristor T2 when this signal is positive. Thus, the thyristor T2 will be fired at the times t=t2, t=t4 and so on, that is, this thyristor is controlled with the control angle $\beta$ relative to the zero crossings of the fundamental frequency component of the capacitor voltage.

The two thyristors are controlled with the same control angle $\beta$, that is, the control is performed with the same control angle during the positive and negative half-cycles of the capacitor voltage. Therefore, the control may be said to be symmetrical. The control angle is 90° when the control voltage $U_s$ is zero and decreases with increasing control signal $U_s$. By varying the control signal $U_s$, the equivalent inductance of the inductor L for the fundamental frequency component may be varied from a lowest value, which is the inductance of the inductor itself, and up to an inductance which, in principle, is infinite. The susceptance of the series capacitor may then be varied from a minimum value $B_C+B_L$ to a maximum value $B_C$, where $B_C$ is the susceptance of the capacitor bank at the system fundamental frequency and $B_L$ is the susceptance of the inductor L at the system fundamental frequency ($B_L$ is negative).

The above-described symmetrical control of the thyristors with the aid of the control signal Us may advantageously be used together with the control of the invention which will be described in the following.

As is shown in FIG. 4, the subharmonic component $U_x$ is supplied to the summation circuits 8 and 9 with different signs (positive for the summation circuit 8 and negative for the summation circuit 9). Thus, a positive value of the signal $U_x$, for example, will, as far as the summation circuit 8 is concerned, act in the same way as a reduction of the control signal $U_s$ and hence cause an increase of the control angle for the thyristor T1. A positive signal $U_x$, on the other hand, will, as far as the summation circuit 9 is concerned, act as an increase of a control signal $U_s$ and hence give rise to a reduction of the control angle for the thyristor T2. In a corresponding way, a negative value of the signal $U_x$ causes a reduction of the control angle of the thyristor T1 and an increase of the control angle of the thyristor T2. Thus, the influence on the control, caused by the signal $U_x$, gives rise to an unsymmetry between positive and negative half cycles of the capacitor voltage. This unsymmetry causes a mean value of the capacitor voltage different from zero, and this mean value depends on and may be controlled with the aid of the signal $U_x$.

Figure 6:
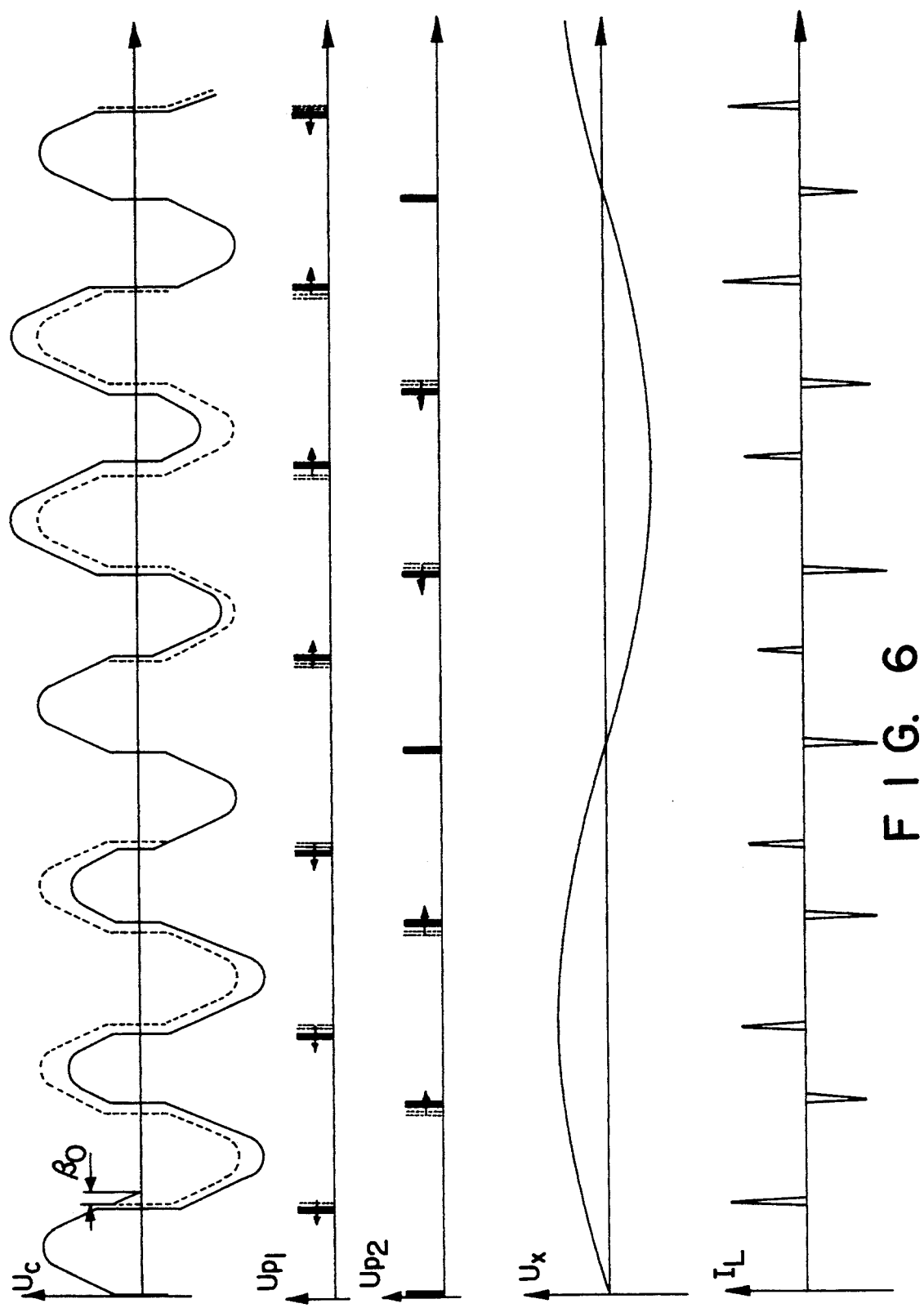
FIG. 6 shows how, in equipment according to the invention, the control of the inductor may be used for generation of a subsynchronous voltage component across the series capacitor.

FIG. 6 shows how a detected SSR component $U_x$, via the firing of the thyristors, controls the mean value of the capacitor voltage. The control signal $U_s$ is assumed to be somewhat lower than the peak value of the voltage $U_{osc}$, which corresponds to the control angle $\beta_o$. The curve shape of the capacitor voltage and the control pulses for the case where $U_x=0$ (no SSR oscillation) are shown in shaded lines in FIG. 6. The corresponding signals and the voltage $U_x$ and the current pulses IL through the inductor L are shown in unbroken curves in FIG. 6 for the case where an SSR oscillation is detected, that is, the signal $U_x \ne 0$.

The reactance at power system frequency of the inductor L is assumed to be considerably smaller than the reactance of the capacitor bank at the power system frequency, which means that the natural frequency of the oscillation circuit L-C is considerably higher than the system frequency of the network. Upon firing of the thyristor T1, the oscillation circuit just mentioned performs a half-cycle of a natural oscillation, which entails a reversal of the voltage of the capacitor C from the positive value it had when the thyristor was fired to a negative value of, in principle, the same magnitude. The current pulse occurring during the reversal of the voltage is shown at the bottom of FIG. 6.

During the first part of the time interval shown in FIG. 6, the signal $U_x$ is positive. This means that the control pulses to the thyristor T1 are somewhat advanced in time and the control pulses to the thyristor T2 are somewhat retarded in time in relation to the cases where $U_x=0$. This causes the capacitor voltage to swing over more in the negative direction upon firing of T1 and then not to swing back to the same extent upon firing of T2. Thus, the capacitor voltage swings over more in the negative direction than in the positive direction during the positive intervals for $U_x$. During the negative intervals for $U_x$, the control pulses to T2 are advanced in time and the control pulses to T1 are retarded in time. This causes the capacitor voltage during these intervals to swing over more in the positive direction than in the negative direction.

Figure 7:
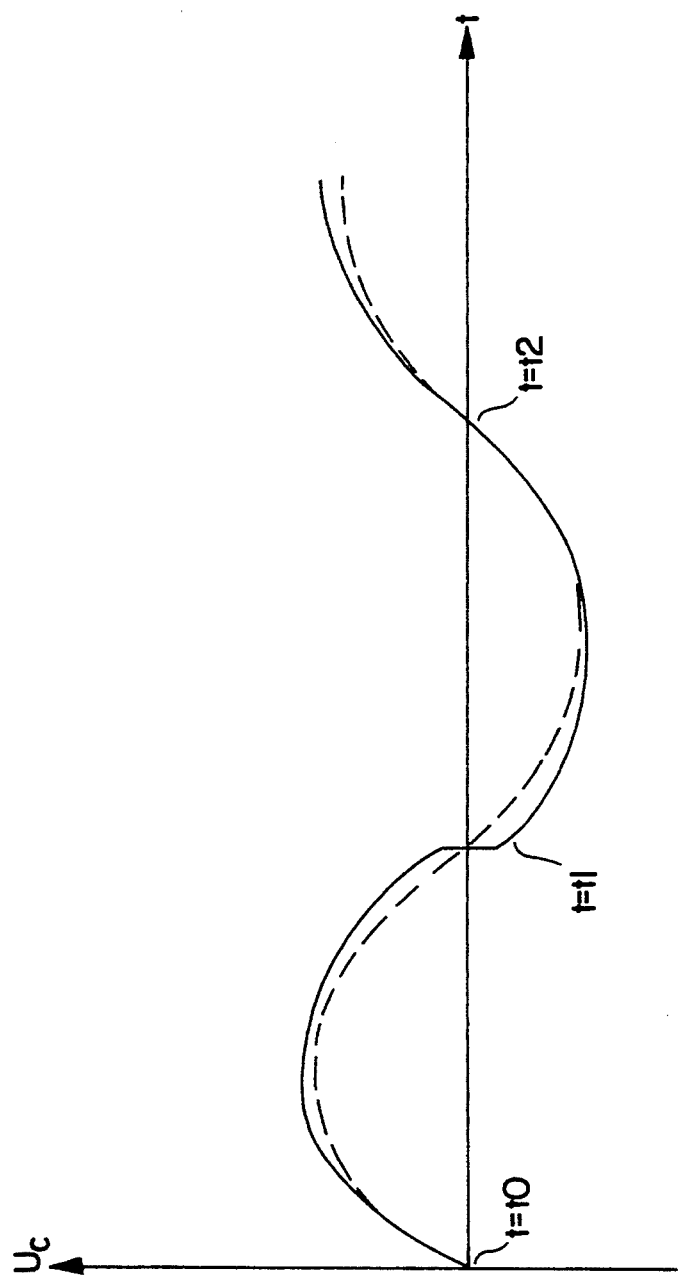
FIG. 7 shows the mode of operation of equipment according to the invention, which is controlled with the aid of a simplified control device.

Thus, in the manner now described, the mean value of the capacitor voltage UC will be controlled by the detected SSR component $U_x$. As will be clear from FIG. 6, a positive value of $U_x$ gives a displacement of the mean value of the capacitor voltage in the negative direction and a negative value of $U_x$ will give a displacement in the positive direction of the mean value of the capacitor voltage. Thus, the capacitor voltage will contain a subsynchronous component with the same frequency as the signal $U_x$. In practice, this component will be somewhat offset in phase in relation to the signal $U_x$. By using suitable filters for the formation of the signal $U_x$, this signal may be given such a phase position that the generated subharmonic component of the capacitor voltage in opposition to the SSR oscillation. In this way, a subsynchronous resonance oscillation may be effectively counteracted and damped. The equipment described has an inherent damping effect on the SSR oscillation even if the detection (units 5, 6, 7 in FIG. 4) of the signal $U_x$ is omitted. In FIG. 7 it is assumed that $U_s$ is equal to the peak value of $U_{osc}$, that is, that the control angle $\beta=0$. The broken-lined curve shows the capacitor voltage in the absence of any SSR oscillation. At t=t0 it is assumed that an SSR oscillation suddenly occurs and displaces the capacitor voltage $U_c$ in the positive direction (unbroken line). At t=t1, $U_c$ would have been zero but now has a positive value because of the SSR oscillation. Because the thyristor T1 is fired at t=t1, $U_c$ is reversed to the corresponding negative value. During the subsequent negative half-cycle, because of the SSR oscillation a continued displacement of $U_c$ in a positive direction takes place so that, at t=t2, $U_C$ is again zero. By the firing of T1 at t=t1, a displacement of $U_c$ in a negative direction is obtained, which cancels the positive displacement caused by the SSR oscillation. The result is a damping of the SSR oscillation.

In the embodiment described with reference to FIG. 7, the capacitor voltage may alternatively be sensed at the zero crossings of the fundamental frequency component and the firing be delayed until the voltage has dropped to a certain fraction, for example 50%, of the sensed value.

Common to the described embodiments of the invention is that the control angle of the semiconductor valves during the two half-cycles of at least certain pairs of consecutive half-cycles of the capacitor voltage assumes separate values, the control angle being referred to the total capacitor voltage (the sum of fundamental tone and harmonic components).

As will be clear from the above description, with the aid of the invention series capacitor equipment can be obtained which provides a possibility of efficient damping of subsynchronous resonance oscillations. According to the invention, this can be accomplished, in principle, without any consumption at all of active energy, which results in small dimensions of the equipment, a low price, and a minimum of cooling requirement.

The pieces of equipment described above are only examples of embodiments according to the invention and a large number of other variants are feasible within the scope of the invention. Thus, in FIG. 6, the reversal of the capacitor voltage is schematically shown in vertical lines, indicating a natural oscillation frequency of the reversal circuit which is much higher than the system frequency of the network. In practice, of course, the natural frequency of the reversal circuit may be chosen lower than what has been indicated in FIG. 6. For the invention to provide the desired function, however, it has proved that the natural frequency of the reversal circuit should be at least five times as great as the system frequency of the power network. Expressed in other terms, this means that the reactance of the inductor L at the system frequency of the network should be at least twenty-five times lower than the reactance of the capacitor C, also this being referred to the system frequency.

I claim:

1. Series capacitor equipment with a capacitor bank adapted for connection in series into an electric power line and with a controllable circuit, connected to the capacitor bank, for damping sub-synchronous resonance oscillations, the controllable circuit being connected in parallel with the capacitor bank and including an inductor connection, controllable in both directions, with at least one inductive component and at least one controllable semiconductor valve connected to said component, and the equipment further comprising a control member which, on the occurrence of a sub-synchronous resonance oscillation, controls the semiconductor valve to generate a current through the capacitor bank and the controllable circuit, which current creates a sub-synchronous voltage that counteracts a sub-synchronous voltage across the capacitor bank caused by a sub-synchronous current in the power line.

2. Series capacitor equipment with a capacitor bank adapted for connection in series into an electric power line and with a controllable circuit, connected to the capacitor bank, for damping sub-synchronous resonance oscillations, the controllable circuit being connected in parallel with the capacitor bank and including an inductor connection, controllable in both directions, with at least one inductive component and at least one controllable semiconductor valve connected to said component and the equipment further comprising a control member which detects the occurrence of a sub-synchronous resonance oscillation, and controls the semiconductor valve to conduct with control angles which are, during consecutive half-periods of the capacitor voltage, alternately greater and lesser than a preset control angle, thereby supplying a current to said capacitor bank which produces a voltage which opposes said sub-synchronous resonance oscillation.

3. A series capacitor equipment according to claim 1 or 2, wherein the control member controls said one semiconductor valve and a second semiconductor valve connected in parallel with each other, with different control angle values relative to the capacitor voltage during each of two half-cycles of at least certain pairs of consecutive half-cycles of the capacitor voltage for generation of the voltage counteracting the sub-synchronous resonance voltage.

4. Series capacitor equipment according to claim 1 or 3, wherein the control member is adapted to control the controllable semiconductor valve with a control angle which is variable relative to the fundamental frequency component of the capacitor bank voltage.

5. Series capacitor equipment according to claim 4, wherein the control member is adapted to form a signal corresponding to a sub-synchronous component of the capacitor bank voltage and, at each firing of a controllable semiconductor valve, to determine the control angle relative to the fundamental frequency component of the capacitor bank voltage depending on the current value of said signal.

6. Series capacitor equipment according to claim 5, wherein the control member comprises a low-pass filter for filtering the capacitor bank voltage and the signal corresponding to a sub-synchronous component of the capacitor bank voltage is formed from an output signal of said low-pass filter.

7. Series capacitor equipment according to claim 1 or 3, wherein the control member renders the controllable semiconductor valve conductive at the zero crossings of the fundamental frequency component of the capacitor bank voltage.

8. A controllable circuit for damping a sub-synchronous oscillation voltage which occurs in a series capacitor equipment having a capacitor bank connected in series with an electric power line comprising:
an inductor having one end connected to one side of said capacitor bank;
a pair of unidirectional semiconductor devices connected in parallel with each other, and connected in series with a remaining end of said inductor, and a remaining side of said capacitor bank; and,
a sub-synchronous oscillation voltage detection means connected to said capacitor bank for detecting a sub-synchronous oscillation voltage, and for generating first and second gating pulses for controlling said pair of unidirectional semiconductor devices to generate a current which produces a voltage across said capacitor bank to reduce said sub-synchronous oscillation voltage.

9. The controllable circuit for damping a sub-synchronous oscillation voltage according to claim 8, wherein said sub-synchronous oscillation voltage detection means produces pulses for each half-cycle of a power current flowing through said capacitor bank which alternately enable said pair of unidirectional semiconductor devices.

10. The controllable circuit for damping a sub-synchronous oscillation voltage according to claim 9, wherein said pair of unidirectional semiconductor devices are controlled so that as the sub-synchronous oscillation voltage increases, a conduction angle for one of said unidirectional semiconductor devices increases and a conduction angle for the other of said unidirectional semiconduction devices decreases to generate the current which cancels said sub-synchronous oscillation voltage.

* * * * *